US006423363B1

(12) United States Patent
Traska et al.

(10) Patent No.: US 6,423,363 B1
(45) Date of Patent: *Jul. 23, 2002

(54) AQUEOUS DISPERSION

(75) Inventors: Alexander Wolodymyr Traska, Keedysville; Matthew Patrick, Annapolis, both of MD (US)

(73) Assignee: Lipton, division of Conopco, Inc., Englewood Cliffs, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/916,877

(22) Filed: Aug. 22, 1997

(51) Int. Cl.⁷ ............................................. A23D 7/005
(52) U.S. Cl. ........................ 426/604; 426/603; 426/602
(58) Field of Search ................................ 426/611, 612, 426/604, 603, 602

(56) References Cited

U.S. PATENT DOCUMENTS

| | | | |
|---|---|---|---|
| 3,004,043 A | 10/1961 | Stern | |
| 3,519,436 A * | 7/1970 | Bauer | |
| 3,617,308 A | 11/1971 | Graffelman | 99/118 |
| 3,809,764 A | 5/1974 | Gabby et al. | |
| 3,865,939 A * | 2/1975 | Jandacek | 424/238 |
| 3,956,522 A | 5/1976 | Kattenberg et al. | 426/189 |
| 4,160,850 A * | 7/1979 | Hallstrom | 426/601 |
| 4,195,084 A * | 3/1980 | Ong | 424/238 |
| 4,218,334 A * | 8/1980 | Lundmark | |
| 4,386,111 A | 5/1983 | Van Heteren et al. | |
| 4,391,732 A * | 7/1983 | Lundmark | |
| 4,526,793 A * | 7/1985 | Ingenbleek | 426/602 |
| 4,888,197 A * | 12/1989 | Wieske | 426/603 |
| 4,917,915 A * | 4/1990 | Cain | 426/603 |
| 4,943,445 A * | 7/1990 | Norton | 426/603 |
| 5,151,290 A * | 9/1992 | Norton | 426/602 |
| 5,156,866 A * | 10/1992 | Sato | 426/5 |
| 5,194,285 A * | 3/1993 | Norton | 426/602 |
| 5,217,742 A * | 6/1993 | Jones | 426/603 |
| 5,244,887 A * | 9/1993 | Straub | 514/182 |
| 5,279,844 A | 1/1994 | Wesdorp et al. | |
| 5,302,408 A * | 4/1994 | Cain | 426/603 |
| 5,306,517 A * | 4/1994 | Norton | 426/603 |
| 5,310,556 A | 5/1994 | Ziegler | 424/401 |
| 5,338,564 A * | 8/1994 | Meyer | 426/611 |
| 5,445,811 A * | 8/1995 | Norrlind | 424/9.4 |
| 5,502,045 A * | 3/1996 | Miettinen | 514/182 |
| 5,514,398 A | 5/1996 | Imai et al. | |
| 5,591,725 A * | 1/1997 | Norton | 426/601 |
| 5,624,702 A * | 4/1997 | Scotel | 426/603 |
| 5,656,323 A * | 8/1997 | Underdown | 426/603 |
| 6,031,118 A * | 2/2000 | van Amerongen | 552/544 |
| 6,162,483 A | 12/2000 | Wester | |
| 6,190,720 B1 | 2/2001 | Yuan et al. | |

FOREIGN PATENT DOCUMENTS

| | | |
|---|---|---|
| CA | 2 091 152 | 3/1993 |
| DE | 28 32 636 | 3/1980 |
| EP | 041 303 | 11/1983 |
| EP | 209 176 | 1/1987 |
| EP | 289 636 | 6/1987 |
| EP | 249 282 | 12/1987 |
| EP | 470 658 | 7/1991 |
| JP | 61058536 | 3/1986 |
| JP | 62148424 | 7/1987 |
| JP | 06329588 | 5/1993 |
| NL | 178559 | 8/1974 |
| NL | 149687 | 6/1976 |
| NL | 155177 | 3/1977 |
| WO | 92/09209 | 6/1992 |
| WO | 96/38047 | 12/1996 |
| WO | 99/44442 | 9/1999 |

OTHER PUBLICATIONS

Communication pursuant to Article 96(2) and Rule 51(2) EPC.
European Search Report dated Dec. 1,1998.

* cited by examiner

Primary Examiner—Carolyn Paden
(74) Attorney, Agent, or Firm—Gerard J. McGowan, Jr.

(57) ABSTRACT

Aqueous dispersions of plant sterols and other high melting lipids. The dispersions are useful in spreads and other food products. The dispersions provide structure to the food products and their use can permit minimization or elimination of saturated fats and trans fatty acids. The invention is also directed to a process for making the dispersions and to water and fat continuous spreads and other food products including the high melting lipids.

42 Claims, No Drawings

AQUEOUS DISPERSION

BACKGROUND OF THE INVENTION

Hydrogenation, fractionation and interesterification are the most common processes utilized within the fats and oils industry to modify the chemical and/or physical properties of conventional triglyceride fats or other lipids to improve their utility and functionality, e.g. to modify melting points, increase hardness or the solid fat content, increase oxidative stability, etc. These processes may be used individually or can be combined to produce fats and oils with very specific characteristics. When employing these processes to increase hardness or the solid fat content in the simplest of terms, these processes rely on the reduction of unsaturation or the increase of saturation and/or the formation of trans fatty acids.

Considerable attention has been drawn in recent years to the relatively high total fat, saturated fat and trans fat content of the typical diet.

Related health issues which have been greatly publicized are elevated cholesterol levels and low HDL/LDL cholesterol ratios reportedly resulting from ingestion of saturated fats and cholesterol. And, in addition to saturated fats, some reports have implicated trans fatty acids, which are generated when liquid oils are partially hydrogenated to increase their solid fat content.

Phytosterols are sterols found in plants. While these compounds have long been touted for their cholesterol lowering effects, they tend to be very high melting compounds (melting points around 150° C.), and they are difficult to formulate into consumer food products due to poor solubility in fats and immiscibility in water. This solubility problem has been partially mitigated by esterification of the sterol. Nevertheless, this still limits use of sterols to food compositions with moderate to high fat contents.

U.S. Pat. No. 5,156,866 discloses sterols used in chewing gums. An emulsifier is added to decrease viscosity.

U.S. Pat. No. 5,445,811 is directed to phytosterols used in an oil-in-water emulsion intended for intravenous administration as a contrasting agent for visibilizing the presence of tumors. Synthetic emulsifiers of the type normally used for preparing oil-in-water emulsions are said to be of particular interest. The weight ratio between emulsifier and cholesterol or phytosterol can range between 1:1 and 1:2. In Example 2, 0.06 g cholesterol is used per 100 ml of mixture. The mixture is homogenized and autoclaved at 121° C. In Example 1, 2 g of cholesterol are used and the mean particle size of the emulsion is 0.25 mu m. In Example 6, 1.5 g of cholesterol per 100 ml mixture are used. It is said that the mean size of the emulsion particles will preferably be beneath 1 mu m.

U.S. Pat. No. 5,244,887 is directed to the use of plant stanols to reduce cholesterol absorption from foods. It is said that the greatest effectiveness is obtained when the stanols are evenly distributed in finely divided form throughout the food product or beverage. This can be accomplished by dissolving the stanols in a solubilizing agent such as vegetable oil, monoglyceride, diglycerides, tocopherols, and mixtures thereof and making suspensions or emulsions of the solubilized stanols in carriers such as water, alcohol, polyols and other edible compounds or by suspension of the stanols in an emulsion. Solubilizing agents such as monoglycerides and diglycerides are mentioned. A preferred food additive is said to comprise, in addition to 25% stanols, 74.8% vegetable oil and tocopherol. The compounds of the invention are used as food additives to foods such as meats, eggs, and dairy products. The stanols are said to remain in solution or uniformly suspended.

U.S. Pat. No. 4,160,850 mentions low fat margarine products having less than 60 wt. % fat. The invention is directed to a shelf stable mix suitable for consumer preparation of a spreadable butter substitute having from about 20–80% oil and from about 10 to about 80% water. A water-in-oil emulsifier is included. Preferred emulsifiers are phytosterols. In preparing the solid form of the mix, the emulsifier and hard fat having a melting point of from about 29° C. to about 66° C. are formed together as a mixture and solidified. The emulsifier is then added to the melted fat and mixed until a clear solution is obtained.

U.S. Patent No. 3,865,939 is directed to edible cooking and salad oil compositions having enhanced hypocholesterolemic properties including plant sterols. The limited solubility of plant sterols in any solvent system is noted. A solubilizing agent to solubilize the plant sterol in the oil is selected from the group consisting of fatty acids, monoesters of fatty acids with polyhydric alcohols and alkanols. The invention is said also to contemplate peanut better, mayonnaise, ice cream and margarine spreads. A solubilizing agent may be selected from a group including simple esters of fatty acids such as monoglycerides.

U.S. Pat. No. 5,502,045 is directed to a beta-sitostanol fatty acid ester or mixture thereof which lowers cholesterol levels. In Example 5 a beta-sitostanol ester mixture is added to the fatty part of a conventional soft margarine.

Ong, U.S. Pat. No. 4,195,084 is directed to a pharmaceutical preparation comprising a taste-stable aqueous suspension of tall oil sitosterols.

Beta sitosterol is described as being the most effective of the sterols for lowering serum cholesterol. Because of certain physical properties of the sterols, it is said not to have been practical to provide a pharmaceutical suspension for oral administration which contains much more than 20 w/v of sitosterols. It is said that in order for sitosterols to be the most effective in lowering serum cholesterol the medicament must reach the gastrointestinal tract in a finally divided dispersed state.

Ong also reports that sitosterols do not lend themselves readily to incorporation into an aqueous preparation for oral administration that has a pleasant mouthfeel.

The Ong invention is directed to an aqueous pharmaceutical suspension comprised of finally divided tall oil sitosterols, a pharmaceutically acceptable chelating agent, sodium carboxymethylcellulose, sorbitol, a pharmaceutically acceptable surfactant, simethicone and water. The product is said to have an acceptable taste and mouthfeel that does not change over an extended storage period.

The pharmaceutical suspension of Ong may contain up to about 25 w/v of finally divided tall oil sitosterols. At about 20% tall oil sitosterols, the suspension is said not to be excessively viscous and is relatively easy to pour, having both good physical and chemical stability. A tall oil sitosterols preparation is said to develop no taste change after one year of shelf storage as compared with bitter taste development within two weeks at room temperature for a suspension of tall oil sitosterols not within the Ong invention. It is said that tall oil sitosterols are very hydrophobic and stubbornly resist wet wetting. Vigorous continuous agitation is said to be required to disperse the tall oil sitosterols in the vehicle.

The Ong phytosterol are said to be ground to a mean particle size of 25 microns or below by use of an air mill, high energy hammermill or air filtration mill under refrigeration or through the use of finely ground dry ice.

EP 289 636 discloses an emulsified or solubilized sterol composition wherein the sterols are emulsified or solubilized in an aqueous solution of polyhydroxy compounds containing sucrose fatty acid esters and/or polyglycerol fatty acid esters or liquid polyhydroxy compounds. A considerably high shelf stability is said to result and the invention is said to be extremely useful in various products including food, cosmetics, drugs and agricultural chemicals.

Sterols are described as high melting compounds which are hardly soluble in water and have a melting point of approximately 150° C. It is said to be difficult to obtain a stably emulsified or solubilized composition. Beta-sitosterol is mentioned among the sterols which may be used in the '636 invention.

The compositions are prepared by, for example, adding sucrose ester and/or polyglycerol fatty acid ester to an aqueous solution of polyhydroxy compound, heating the mixture to 50 to 60° C., adding powdery sterols, stirring the obtained mixture at 50–90° C. to dissolve the sterols and diluting the obtained solution if required. The compositions are said to show stable emulsification or solubilization without causing any separation of the sterols. "Effect of Plant Sterols on Lipids and Atherosclerosis", Pollack, O. J., Pharmac. Ther., 31, 177–208 (1985) is reported in U.S. Pat. No. 5,244,887 as suggesting the inclusion of plant sterols such as beta-sitosterol in such foods as butter and margarine to counteract not only the cholesterol in butter, but all other dietary cholesterol and cholesterol from non-dietary sources available for absorption and reabsorption.

SUMMARY OF THE INVENTION

The present invention is directed to the discovery that phytosterols and other high melting lipids can be used to impart structure to water and fat continuous spreads and other products including aqueous phases. As mentioned above, U.S. Pat. No. 3,865,939 discloses the well known difficulties in solubilizing plant sterols in any solvent system.

In the present invention, an aqueous dispersion of phytosterol or other high melting lipid is formed which is finely dispersed and stable, wherein the phytosterols or other high melting lipid serve to structure the aqueous dispersion. This is particularly useful in water and fat continuous spreads and other food systems or compositions, wherein the aqueous phase is structured by the phytosterol or other high melting lipid.

By using phytosterols or other high melting lipids as structuring agents, it is possible to avoid or minimize the use of saturated fat and other traditional structure-imparting ingredients in food products. For example, the presence of conventional thickeners such as gelatin and xanthan gum can be minimized or avoided. Moreover, even the inclusion of partially hydrogenated fat, which generally include trans fatty acids, can be avoided by use of phytosterols or other high melting lipids as structuring agents. At the same time, an added benefit where phytosterols are used is the reported cholesterol lowering effect of phytosterols. An even further benefit is the reduced calories which result from using high melting lipids as structuring agent since phytosterols and some other high melting lipids are barely or completely non-digestible.

Although a particularly advantageous use of the aqueous dispersions of the invention is in the preparation of water continuous low or no fat spreads, other food products can benefit from inclusion of the aqueous dispersions or suspensions according to the invention. These include fat continuous spreads which may be either vegetable oil or butter fat based, bi-continuous spreads, dressings, beverages, dairy products, such as milk, cheeses, yogurt, non-dairy coffee whiteners, beverages, ice cream, and confections such as candy or chocolate.

The aqueous dispersions are useful as such in the preparation of foods and other products. Indeed, with the dispersions and process of the invention, it is possible to make very concentrated phytosterol dispersions or suspensions, which have a number of important functional uses such as structuring, bodying and bulking agents, and whitening/opacity providers, especially in reduced and low fat foods.

The phytosterols and other high melting lipids are preferably present in the dispersion or suspension as very finely divided particles having a size of 15 microns or less. The dispersion or suspension also generally include a non-phytosterol emulsifier. However, inclusion of a nonsterol emulsifier may be omitted where sterols have been esterified with highly hydrophilic compounds such as citric acid, tartaric acid, for example. Such a chemical modification to phytosterols or other sterols would preclude the need to use a separate emulsifier of the type such as mono and diglyceride and polysorbate 60 in preparing the dispersion or suspension.

The weight to weight ratio of emulsifier to phytosterol or other high melting lipid in the aqueous phase is preferably less than 1:2. Moreover, the aqueous phase dispersion or suspension according to the invention need not include a large amount of triglyceride fat or other non-high melting lipid. The weight to weight ratio of non-phytosterol, non-high melting lipid to phytosterol or other high melting lipid in the aqueous phase is preferably less than 1:6.

A particularly advantageous use of the aqueous dispersions of the invention is in an oil-in-water-in-oil spread. In such spreads, the phytosterols or other high melting lipids are preferably used to structure both the continuous oil phase (external phase) and the dispersed aqueous phase. It has been found that such spreads including a continuous oil phase having phytosterols or other high melting lipids, a dispersed aqueous phase having phytosterols or other high melting lipids and a second oil phase dispersed in the aqueous phase have a reduced tendency toward oil separation and therefore an increased product stability. Preferably the continuous fat phase comprises from 0.5 to 5 wt. % phytosterol or other high melting lipid and the dispersed aqueous phase comprises from 2 to 15 wt. % phytosterol or other high melting lipid.

The aqueous dispersions or suspensions of the invention are preferably prepared by melting the phytosterol (or other high melting lipid) and the emulsifier and dispersing the molten phytosterol (or other high melting lipid) and emulsifier in water under shear. While not wanting to be limited by theory, it is believed that the step of melting the high melting phytosterols with surfactant prior to dispersing in water with or without surfactant contributes importantly to the ability to prepare a very fine dispersion with the use of high shear mixing or homogenization of the phytosterol or other high melting lipid. Preferably the phytosterols or other high melting lipid in the present process and dispersions have been reduced to a size of 15 microns or lower, preferably 10 microns or lower.

DETAILED DESCRIPTION OF THE INVENTION

The high melting lipid of the invention is preferably a phytosterol, i.e. plant sterols, such as alpha sitosterol, beta sitosterol, stigmasterol, ergosterol and campesterol, alpha spinosterol and brassiciasterol. Although the foregoing are some of the more important phytosterols, at least 44 phytosterols have been identified and it will be apparent to one of ordinary skill that many of these will be appropriate for the present invention. Phytosterols are identified in bean (1993) phytosterols in "Advances in Lipid Research", pages 193–218, Paoletti, and Kiritchevsky, (Eds) Academic Press, NY, the disclosure of which is incorporated herein by reference. The disclosure of "Effect of Plant Sterols on Lipids and Atherosclerosis", Pollack, O. J., Pharmac. Ther., 31, 177–208 (1985) mentioned above is also incorporated by reference herein.

Many sources of phytosterols are known. Among sources are disclosed in Pollak "Effect of Plant Sterols on Serum Lipids and Atherosclerosis", Pharm. Ther. Vol. 31, pp. 177–208, 1985, the disclosure of which is hereby incorporated by reference. See especially Table 7 on page 202. Among the more important sources are rice bran, corn bran, corn germ, wheat germ oil, corn oil, safflower oil, oat oil, olive oil, cotton seed oil, soybean oil, peanut oil, black tea, orange juice, valencia, green tea, Colocsia, kale, broccoli, sesame seeds, shea oils, grapeseed oil, rapeseed oil, linseed oil, canola oil, tall oil from wood pulp and other resinous oil from wood pulp.

While particular benefit is obtained when the invention is used to emulsify or solubilize phytosterols, especially those which have been shown to have a cholesterol lowering benefit, zoosterols, fungal, algeal and microbial sterols, and other high melting sterols and other lipids may also be used, as appropriate. Among the known zoosterols are cholesterol, 24-methylene-cholesterol, 7,22-dehydroxycholesterol and desmosterol.

It will generally be desirable to employ high purity and practical grade sterols and other high melting lipids which are suitable for ingestion by humans.

In addition to zoosterols, phytosterols and other sterols, it is believed that the present invention may be used advantageously with other high melting, water insoluble lipids. The high melting, water insoluble, sterols and other lipids of the invention have a melting point within the range of 75–200° C. Especially preferred are lipids with melting points of 100–200° C., and especially from 125–175° C.

Another class of high melting lipids, in addition to the sterols, which may be used herein is the waxes, such as cornauba wax, bees wax, waxes and wax esters from vegetable oil sources.

Melting point may be measured by known methods such as the AOCS capillary tube method and/or the Thomas-Hoover Uni-Melt melting point apparatus, ex. Thomas Scientific, Swedesboro, N.J.

The invention is used to greatest advantage when employing phytosterols and other sterols which have not been esterified. Phytosterols which have been esterified are more readily dissolved in oil phases and do not face to as great an extent the problem of solubilization and dispersion in food products having continuous fat phases. However, it may be appropriate under certain circumstances to utilize esterified phytosterols and other high melting lipids, so long as they are high melting, immiscible in water and fall in the desired melting temperature range of 75–200° C.

While the invention has been described as being particularly relevant to sterols, the invention may also be applied to their hydrogenated counterparts, such as phytostanols and to other chemically modified sterols. Chemical modifications include in addition to complete and partial hydrogenation, esterification, including interesterification. Examples of phytostanols include campestanol, 22,23 dihydrobrassicastanol, beta-sitostanol and clionastanol. Fatty acids esterified to the sterols include long and short chain fatty acids, i.e. $C_1$–$C_{22}$.

The phytosterols or other high melting lipids will comprise generally about 1 to about 75% of the aqueous dispersions, preferably from 5 to 40 wt. %. Many emulsifiers may be used to disperse the phytosterols or other high melting lipids. Preferred emulsifiers include polyglycerol esters and tweens, especially polysorbate 60. Other examples of emulsifiers which may be used include mono- and diglycerides, e.g., Myverol 18-04 available from Quest International, Hoffman Estates, III., sodium stearoyl lactylate, and polysorbates.

The aqueous dispersions according to the invention may include, in addition to the phytosterols or other high melting lipids, ingredients such as the following: water, salt, flavors, preservatives, gums, starches, gelatin, milk and milk protein, colors, acidulants such as citric acid. Obviously, the aqueous dispersion may contain ingredients destined for the ultimate food product to be prepared from the dispersion.

The aqueous phytosterol and other high melting lipid dispersion of the invention may be concentrated by centrifugation, decantation, evaporation or other methods, The concentration of the phytosterols or other high melting lipids in the aqueous dispersion can range from 0.1 to 99 wt. %, especially from 5 to 75, more particularly from 10 to 50.

As indicated above, a preferred method of preparing the aqueous dispersion involves mixing molten phytosterol or other high melting lipid together with molten surfactants in water. Preferably the surfactant level in the molten phytosterol phase is 1–20 wt. %. Alternatively, the molten surfactant can be incorporated separately into the aqueous phase.

Among the foods in which the dispersions of the invention can provide structuring include water continuous spreads, fat continuous spreads, dressings, drinks, dairy products (such as milk, yogurt, cheese, cream cheese) dry mixes, powdered non-dairy coffee whiteners, milkshake mixes, instant milks, cake mixes and other food and pharmaceutical preparations.

As indicated above, the aqueous dispersions can be used to structure water continuous spreads or oil-in-water-in-oil spreads. In such case, the phytosterols preferably are present to structure both the continuous oil external phase and the dispersed aqueous phase.

Although not required, if desired the aqueous dispersions of the invention can be used in conjunction with other structuring agents in the spreads and other food products of the present invention. Such structuring agents include the mesomorphic phases of edible surfactant disclosed in WO 92/09209, the disclosure which is incorporated herein by reference.

Spreads according to the embodiment generally contain from less than 80% by weight of edible triglyceride materials. Suitable edible triglyceride materials are for example disclosed in *Bailey's Industrial Oil and Fat Products* (1979). In higher fat spreads, the level of triglyceride material will generally be more than 60% and less than 80%, preferably from 70 to 79% by weight. In spreads of reduced fat content the level of triglycerides will generally be from 30–60%, more generally from 35 to 45% by weight. In very low fat spreads the level of triglycerides will generally be from 0–40%, for example 30%, 25%, 20% or even 10% or about 0%. Other fatty materials, for example sucrose polyesters may be used as a replacement for part or all of the triglyceride material.

The phytosterol or other high melting lipid material for use in spreads is preferably used at a level of from 5–50 wt. % of the aqueous phase, more preferred from 10–50%, most preferred from 20 to 40% by weight. Spreads may comprise additional surfactants to those used to disperse the high melting lipid, for instance, monoglycerides and lecithins, ionic edible surfactant such as lactylated fatty acid salts and phophatidic acid.

In addition to the above mentioned ingredients, spreads in accordance with the invention may optionally contain further ingredients suitable for use in spreads. Examples of these materials are gelling agents, thickening agents, sugars, eg sucrose or lactose, or other sweetener materials, EDTA, spices, salt, bulking agents, flavoring materials, coloring materials, proteins, acids etc. Suitable biopolymer materials which may be included in spreads include, for example, milk protein, gelatin, soy protein, xanthan gum, locust bean gum, hydrolyzed starches (for example PaselliSA2 and N-oil), and microcrystalline cellulose. Other gelling and thickening agents which may be used include but are not limited to carrageenan, pectin, gellan gum, agar, guar, alginate, maltodextrin, native and modified starches, and pregelatinized starches. Appropriate aqueous and fat phase ingredients are found in Cain et al. U.S. Pat. No. 4,917,915 and Norton et al. U.S. Pat. Nos. 5,194,285 and 5,151,290, the disclosures of which are hereby incorporated by reference.

Various sources for the gelling agents include plants, including marine plants, microorganisms, and animals. The amount of biopolymer, if any, in spreads of the invention is dependent on the desired degree of gelling and the presence of other ingredients in the composition. The amount of gelling agent may lie between 0 and 30%, mostly between 0.1 and 25% based on the weight of the aqueous phase of the spread. If hydrolyzed starches are present their level may be from 2–20%; other gelling agents may be used at levels of up to 10%, mostly 1–7%, most preferred 2–5% all percentages being based on the weight of the aqueous phase. Particularly preferred are combination of say 2–15% hydrolyzed starch and 0.5–5% of other gelling materials, especially gelling materials including gelatin.

In addition to or in combination with the above, the aqueous phase of spreads or other foods may include the following ingredients: dairy ingredients such as buttermilk, skim milk, milk, salt, acidulants, such as lactic acid and citric acid, butter, yogurt, whey, caseinate, milk proteins, vegetable proteins, vitamins and preservatives such as potassium sorbate and sodium benzoate.

The balance of the spread composition is generally water, which may be incorporated at levels of up to 99.9% by weight, more general from 10 to 98%, preferably from 20 to 97% by weight. Spreads according to the invention may be fat and/or water continuous.

Where the spread or other food product of the invention includes a fat phase, the composition of the fatty phase preferably comprises one or more vegetable oils, preferably sunflower oil, soybean oil, rapeseed oil, canola oil, corn oil, peanut/groundnut oil and the like. Although not generally preferred. If desired, dairy and other animal fat may also be used. Dairy, other animal fat sources and miscellaneous fat sources include milk (milk fat), buttermilk, fish oil, lard and tallow. If desired, the fat may be hydrogenated, fractionated and/or interesterified, but again it will usually be less desirable to include hydrogenated fat, which will be saturated and which may include trans fatty acids.

While the fat that is applied in these fat based food products can be any fat, such as dairy fat and/or vegetable fat, if fat is present, for health reasons the use of one or more vegetable fat sources is preferred. In particular, the use of liquid fats is preferred. The fat can be one single fat or a blend. The use of fat compositions comprising a considerable amount of PUFA (poly unsaturated fatty acid) rich triglycerides in addition to the use of the sterol/sterol ester mixture is in particular considered highly beneficial. For example, oils of sunflower, safflower, rapeseed, linseed, linola and/or soybean can be used in a preferred embodiment. Also the fat compositions mentioned in Netherlands patent documents no. NL 143115, NL 178559, NL 155436, NL 149687, NL 155177, European patent documents EP 41303, EP 209176, EP 249282, and EP 470658, the disclosures of which are incorporated by reference herein, are highly suitable.

If a fat blend is used, it is preferred that it comprises at least 30%, and more preferred at least 45% of polyunsaturated fatty acid moieties, based on the total weight amount of the fat in the fat based food product. So a strong effect on the cholesterol lowering effect is obtained if use is made of an optimal ratio of sterol and sterol-esters as set forth in this application in a food product in which a fat blend comprising at least 30 wt. % of PUFA rich triglycerides is used.

Where butterfat is used for preparing spreads of the invention, or where the spreads are butter, it is preferred that the amount of phytosterol is in the range of 5–15%, preferably 10–15%. As the consumption of butter is considered less beneficial for consumers health, the present invention is in particular suitable for making butter or butter-melanges containing spreads, as the negative effect associated with the butter consumption can be minimized or even reversed.

Generally, dressings or mayonnaise are oil in water emulsions. The oil phase of the emulsion generally is 0 to 85% by weight of the product. For higher fat products the level of triglycerides is generally from 60–85%, especially from 65–80% by weight. For salad dressings the level of fat is generally from 10–60%, more preferred from 15 to 40%. Low or no-fat containing dressings may for example contain triglyceride levels of 0, 5, 10 or 15% by weight.

Other fatty materials such as for example polyol fatty acids ester may be used as a replacement for part or all of the triglyceride materials in the dressings or other foods of the invention.

The level of edible surfactant material in the dressing will generally be from 0.1 to 15%, more preferred from 1–10%, most preferred from 2 to 8% by weight. Preferably the level of nonionic edible surfactant is from 0.1 to 15%, more preferred, 0.5–10%, most preferred 1 to 8% by weight.

Especially preferred are monoglycerides as nonionic edible surfactants. Preferably the level of ionic edible surfactant is form 0 to 5%, more preferred 0.05 to 2%, most preferred 0.1 to 0.5% by weight.

Dressings are in general low pH products with a preferred pH of from 2–6, more preferred 3–5, for example about 3,5. For the use in dressings the preferred anionic is the diacetyl tartaric ester of monoglycerides (in the examples Admul DATEM 1935 ex. Quest Int. has been used). Also an anionic phospholipid such as phophatidic acid can be applied.

In addition to the above mentioned ingredients dressings in accordance with the present invention optionally may contain one or more other ingredients which may suitably be incorporated into dressings and/or mayonnaise. Examples of these materials are emulsifiers, for example egg-yolk or derivatives thereof, stabilizers, acidifiers, biopolymers, for example hydrolysed starches and/or gums or gelatin, bulking agents, flavors, coloring agents etc. The balance or the composition is water, which could advantageously be incorporated at levels of from 0.1–99.9%, more preferred 20–99%, most preferred 50 to 98% by weight.

The dispersions of the invention are useful as natural, non-caloric multifunctional ingredients in a wide range of food and pharmaceutical products. The aqueous phytosterol dispersions according to the invention can be used as hypocholesterolemic agents, as a non-caloric bulking agent, as a structuring and thickening material, as coloring, clouding and or opacity ingredients, as a high melting carrier for flavors, colors and other materials in a broad spectrum of food and pharmaceutical preparations. The phytosterols or other high melting lipids can also be used as high melting encapsulation materials. Owing to their structuring functionality, the phytosterols and other high melting lipids can be used to replace fat structuring methods such as hydrogenation, interesterification, and use of natural hard fats such as tropical oils and/or animal fats. The aqueous phytosterol or high melting lipid dispersions can be used to replace conventional water structuring agents, as well, such as proteins, carbohydrates, gelatins and other thickeners and stabilizers. Eliminating partially hydrogenated fats removes trans fatty acids and reduces saturated fatty acids and calories. Moreover, the elimination of hydrogenated fats reduces the perception that the products are somehow "unnatural."

Shear can be generated in preparation of the dispersion of the invention by using, eg a turbo mixer, a colloid mill, a ball mill, a homogenizer or other mechanical or sonic devices.

The particle size measurements may be performed by using a Coulter LS particle size analyzer, ex. Coulter, Miami, Fla. or by Particle Sizing Systems Inc. Models 770 Accusizer and Nicomp 370, Santa Barbara, Calif.

Preferably the phytosterols or other high melting lipids have a particle size of 15 microns or lower. Preferably, at least 90% and more preferably 100% of particle sizes fall within a range of between 10 nanometers and 50 microns.

Materials which are typically used include phytosterols either pure or technical grade, either in sterol or stanol form; saturated distilled mono and diglycerides, e.g. Myverol 18-04; water, and polysorbate 60 (Tween 60).

Unless stated otherwise or required by context, the terms "fat" and "oil" are used interchangeable herein. Where a phase is said to constitute essentially the entire product, it is meant that such phase constitutes at least 98 wt. %, especially more than 99 wt % of such product.

Where in this application phytosterols are mentioned, phytosterols, phytostanols, or mixtures thereof may be used as well. Likewise, where sterols are used in this application stanols are also contemplated. Thus, for instance, 4-desmethylsterols, 4-monomethylsterols and 4,4'-dimethylsterols, their stanol equivalents and mixtures thereof in any combination may all be useful, Equipment which is typically employed includes Glass Beakers 250 ml and 2000 ml, hotplate and microwave oven; high shear turbomixer such as a Silverson with a fine screen gram scale, convention oven to melt phytosterol mix at about 150° C., and centrifuge.

EXAMPLE 1
Phytosterol Water Dispersion Process

1. Melt 90 of phytosterols and 10 g of Myverol 18-04 together in a 250 ml beaker.

2. Fill each of two 2000 ml beakers with about 1500 ml of water and heat to a boil in a microwave oven.

3. Place first 2000 ml beaker with the hot water on a hotplate set for about 95° C. which has been placed directly below the Turbomixer agitator shaft.

4. Turn Turbomixer on and gradually increase shaft speed until water is turbulent and a good vortex has formed.

5. Slowly add molten (150° C.) 90/10 phytosterol/18-04 mixture to vortex and increase Turbomixer speed to submerge and quickly disperse the molten mix which will have a tendency to foam and set up quickly on the water's surface. Caution: Addition of molten 90/10 mix must be controlled to keep foaming to a minimum and the temperature mix must not drop by more than a few degrees during this step. Reheat 90/10 mix as necessary and maintain temperature of water at 95° C. by use of the hot plate.

6. After dispersing the first half of the 90/10 mix (about 50 g) in the first beaker with 1500 ml of hot water continue to mix the phytosterol dispersion for about 2 to 3 minutes at high speed. Remove the first beaker from the Turbomixer and begin dispersing the remaining 90/10 mix in the second beaker containing 1500 ml of hot water. Follow the same procedures and precautions.

7. Allow phytosterol dispersion to separate. Decant or siphon off water layer. Taste phytosterol layer; if bitterness exist combine the two phytosterol layers into one beaker and water wash five times using hot water and Turbomixer for each wash cycle. For each cycle, decant wash waster and use about 1500 ml of fresh hot water.

8. The washed or nonwashed phytosterol dispersion is concentrated in a centrifuge to a moisture level of about 70 to 75%. Store the concentrated phytosterol dispersion refrigerated.

9. A similar 90/10 phytosterol dispersion can be made by substituting 10 g of polysorbate 60 for 10 g of Myverol 18-04. Same procedure and precautions apply.

10. The dispersion process (particle size reduction) is facilitated by using 1% polysorbate 60 in the hot water to which the molten phytosterols are added under Turbomix agitation. However, use of polysorbate 60 in the water phase makes separation of the phytosterol layer more difficult and time consuming.

Typical Formulations Based on Water Dispersed Phytosterols:

EXAMPLE 2

65% Oil w/o spread with 10% phytosterols and no trans fats

| Part I-Beaker with Oil Phase | |
| --- | --- |
| Sunflower Oil | 260 g |
| 100% Phytosterols-pure technical | 10 g |
| | 270 g @ 150 C. |
| Part II-Beaker with Water Phase | |
| 90/10 Phyto/18-04 Water Dispersion (72.5% Moisture) | 122 g @ 20 C. |
| Salt/Flavor/color | 8 g |
| | 400 g Cool to 30 C. and fill |

Procedure: Add Part I to Part II under Turbomixer agitation. Cool w/o emulsion in a cold water bath (larger beaker) while emulsion is under agitation. Cool down to about 30° C. and fill in to cup. Refrigerate.

EXAMPLE 3

65% Oil Duplex Emulsion Spread with 10% Phytosterols & no trans fats

| Part I-Beaker with o/w Emulsion | |
|---|---|
| Sunflower Oil | 70 g @ 20/25 C. |
| 90/10 Phyto/18-04 Water Dispersion | 121 g @ 20 C. |
| Salt | 8 g |
| Polysorbate 60 | 1 g |
| | 200 g @ 20/25 C. |

| Part II-Beaker with External Oil Phase | |
|---|---|
| Sunflower Oil | 188 g @ 150 C. |
| Myverol 18-04 | 2 g @ 150 C. |
| 100% Phytosterols-pure/technical | 10 g @ 150 C. |
| Flavor/Color | qs add * |
| | 400 g |

* add flavor/color when Part I & Part II are being combined

Procedure: Using Turbomixer, prepare Part I by dispersing SF Oil in the 90/10 Phyto/18-04 dispersion in which the Polysorbate 60 has been well incorporated. Then add the Part I o/w emulsion to the beaker containing Part II again by using the Turbomixer. Use a cold water bath to cool this fat continuous emulsion down to about 30° C. Fill into cups. Refrigerate.

EXAMPLE 4

Formulations for 0%. 6& and 24% fat water continuous spreads with 10% phytosterols:

| Ingredients | 0% | 6% | 24% |
|---|---|---|---|
| 90/10 PHYTO/18-04 (72.5% moisture) | 162 | 162 | 162 |
| SF oil | — | 24 | 96 |
| Water (95 C.) | 215.95 | 193.15 | 122.45 |
| Gelatin (beef) | 5 | 4.5 | 4 |
| Starch, Remyline AP | 5 | 4.5 | 4 |
| Lactose | 4 | 3.8 | 3.5 |
| Lactic Acid | .3 | .3 | .3 |
| K Sorbate | .05 | .05 | .05 |
| Salt | 6.5 | 6.5 | 6.5 |
| Buttermilk Powder | 1 | 1 | 1 |
| Beta Carotene CWS 1% | .15 | .15 | .15 |
| Flavor and Vitamins | .05 | .05 | .05 |
| | 400 g | 400 g | 400 g |

Preparation: Disperse gelatin and starch in the 90° C. water using the turbomixer. Then add remaining ingredients under agitation. Add flavors/vitamins and the 90/10 Phyto/18-04 dispersion last. Cool down to 20–25° C. pour in cups. Refrigerate.

EXAMPLE 5

| 0% fat reduced calorie mayonnaise | | |
|---|---|---|
| | Control | New |
| Titanium Dioxide | 1.0 | — |
| Vinegar 120 grain | 4.5 | 4.5 |
| Mustard Flour | 0.5 | 0.5 |
| Food Starch Modified | 10.0 | 5.0 |
| K Sorbate | 0.1 | 0.1 |
| Na Benzoate | 0.1 | 0.1 |
| Salt | 2.0 | 2.0 |
| Sugar | 8.0 | 8.0 |
| Beta Carotene | 0.1 | 0.1 |
| Natural Spice Flavor | 0.2 | 0.2 |
| Natural Egg Flavor | 0.2 | 0.2 |
| Phosphoric Acid | 0.2 | 0.2 |
| Water | 73.1 | 39.1 |
| 90/10 PHYTO/18-04 @ 72.5% Moisture | — | 40.0 |
| | 100.0 | 100.0 |

Preparation: Cook all ingredients other than the 90/10 Phyto/18-04 dispersion in starch cooker. Cool the cooked starch and add the phytosterol dispersion under mild agitation. Mill final mixture through a colloid mill.

Formula replaces modified food starch by 50% and use of the artificial food color titanium dioxide (whitening and opacity agent by 100%)

EXAMPLE 6

| Creamy Italian Dressing | | |
|---|---|---|
| | Control | New |
| Soybean Oil | 45.0 | 36.0 |
| Water | 40.4 | 11.0 |
| Sugar | 4.5 | 4.5 |
| Vinegar 120 Grain | 3.0 | 3.0 |
| HVF Algin | 0.2 | 0.1 |
| Buttermilk Powder | 2.2 | 1.0 |
| Lactic Acid | 0.3 | 0.3 |
| Lemon Juice Cone | 0.4 | 0.4 |
| Salt | 2.5 | 2.5 |
| Minced Onion | 0.2 | 0.2 |
| Minced Garlic | 0.5 | 0.5 |
| Xanthan Gum | 0.2 | 0.1 |
| Red Bell Peppers | 0.2 | 0.2 |
| MSG | 0.1 | 0.1 |
| Spices | 0.1 | 0.1 |
| Polysorbate 60 | 0.2 | — |
| 90/10 PHYTO/18-04 Moisture 72.5% | — | 40.0 |
| | 100.0 | 100.0 |

Preparation: Combine ingredients under agitation and process through colloid mill.

Formula eliminates use of polysorbate 60 and reduces use of food gums by 50%, buttermilk powder use by 50% and soybean oil usage by 20%.

It will be apparent that for commercialization the previously mentioned process steps would be upscaled to the appropriate process and equipment sizes, types and standards practiced in the particular or relevant food industry.

It should be understood of course that the specific forms of the invention herein illustrated and described are intended to be representative only as certain changes may be made therein without departing from the clear teachings of the disclosure. Accordingly, reference should be made to the following appended claims in determining the full scope of the invention.

What is claimed is:

1. A food selected from the group consisting of water-continuous spreads, fat continuous spreads, bicontinuous spreads, dressings, beverages, dairy products, milk, cheese, yogurt, non-dairy coffee whiteners, beverages, confections and ice cream comprising an aqueous phase dispersion or suspension comprising
   a) one or more high melting lipids having a mean size of 15 microns or lower, and
   b) a non-sterol emulsifier, the w/w ratio of emulsifier to high melting lipid in said aqueous phase being less than 1:2 wherein the melting lipids structure the food.

2. The dispersion according to claim 1 wherein the high melting lipids have a mean size of 10 microns or less.

3. The dispersion according to claim 2 wherein the w/w ratio of emulsifier to high melting lipid is less than 1:3.

4. The dispersion according to claim 1 wherein the emulsifier is selected from the group consisting of monoglycerides, diglycerides, polysorbates, sodium stearyl lactylate and polyglycerol esters.

5. The dispersion according to claim 1 wherein the emulsifier is an oil-in-water emulsifier.

6. The dispersion according to claim 1 wherein the w/w ratio of emulsifier to high melting lipid is less than 1:2.25.

7. The dispersion according to claim 1 wherein the high melting lipid is a phytosterol which is selected from the group consisting of Beta sitosterol, campesterol, stigmasterol, brassicasterol and ergosterol.

8. The dispersion according to claim 1 wherein the high melting lipid is a chemically modified sterol.

9. The dispersion according to claim 8 wherein the chemically modified sterol is B sitostanol.

10. A food selected from the group consisting of water-continuous spreads, fat continuous spreads, bicontinuous spreads, dressings, beverages, dairy products, milk, cheese, yogurt, non-dairy coffee whiteners, beverages, confections and ice cream comprising an aqueous phase dispersion or suspension comprising
    a) one or more high melting lipids having a mean size of 15 microns or lower, and
    b) a non-sterol emulsifier, the w/w ratio of emulsifier to high melting lipid in said aqueous phase being less than 1:6 wherein the high melting lipids structure the food.

11. The aqueous phase dispersion according to claim 10 wherein the w/w ratio of non-high melting lipid, if any, to high melting lipid in said aqueous phase is less than 1:8.

12. A water continuous edible spread optionally comprising a fat phase, said fat phase if present being discontinuous and constituting from 0 to 85 wt. % of said spread, and a continuous aqueous phase constituting from 15 to 100 wt. % of said spread, said aqueous phase including one or more high melting lipids structuring said spread.

13. The spread according to claim 12 wherein said high melting lipid structures the aqueous phase.

14. The spread according to claim 12 wherein
    a) said high melting lipid has a mean size of 15 microns or lower, and
    b) wherein said aqueous phase further comprises a non-phytosterol emulsifier, the w/w ratio of said emulsifier to high melting lipid in said aqueous phase being less than 1:2.

15. The spread according to claim 12 wherein
    a) said high melting lipids are phytosterols and have a mean size of 15 microns or lower, and
    b) wherein said aqueous phase further comprises a non-phytosterol emulsifier, the w/w ratio of non-phytosterol lipid, if any, to phytosterol in said aqueous phase being less than 1:6.

16. The spread according to claim 12 wherein said fat phase ranges from 0 to 40 wt. % of said spread.

17. The spread according to claim 16 wherein said fat phase ranges from 0.5 to 40 wt. % of said spread.

18. The spread according to claim 12 wherein said aqueous phase constitutes from 60 to 100 wt. % of said spread.

19. The spread according to claim 12 wherein said aqueous phase constitutes essentially 100 wt. % of said spread.

20. The water continuous spread of claim 12 wherein said aqueous phase includes from 5 to 50 wt. % high melting lipids.

21. The spread of claim 11 wherein said spread is plasticized.

22. An edible, fat continuous spread comprising a continuous fat phase constituting from 15 to 80 wt. % of said spread and a discontinuous aqueous phase constituting from 20 to 85 wt. % of said spread, said aqueous phase comprising one or more high melting lipids having a melting point of 100° C. and above and non-phytosterol surfactant wherein said high melting lipid structures the spread.

23. The fat continuous spread according to claim 22 wherein said fat phase includes a structuring lipid selected from the group consisting of a) high melting lipids and b) lipids which are not high melting.

24. The fat continuous spread according to claim 23 wherein said fat phase includes a structuring agent selected from the group consisting of hydrogenated and/or esterified phytosterols, free phytosterols, wax, and aliphatic long chain fatty acids.

25. The fat continuous spread according to claim 22 wherein said structuring fat is selected from the group consisting of hydrogenated oil, interesterified oil, fractionated oils, or non-hydrogenated, non-interesterified non-fractionated hardstock or hydrogenated hardstock fat, interesterified hardstock fat, hydrogenated hardstock fat.

26. The fat continuous spread according to claim 22 wherein said aqueous phase includes from 5 to 50 wt. % phytosterols.

27. The fat continuous spread according to claim 22 wherein the aqueous phase includes dispersed therein a further fat phase.

28. The fat continuous spread according to claim 27 wherein said continuous fat phase comprises phytosterols.

29. The fat continuous spread according to claim 28 which is plasticized.

30. The fat continuous spread according to claim 28 wherein the continuous fat phase comprises from 0.5 to 5 wt. % high melting lipid based on the weight of the product, and said aqueous phase comprises from 2 to 15 wt. % high melting lipid based on the weight of the product.

31. The spread according to claim 22 wherein the weight/weight ratio of said nonsterol surfactant to said high melting lipid in said aqueous phase is less than 1:2.

32. The spread according to claim 22 wherein the ratio of non-high melting lipid, if any, to high melting lipid in the aqueous phase is less than 1:6.

33. A method for preparing a food selected from the group consisting of water-continuous spreads, fat continuous spreads, bicontinuous spreads, dressings, beverages, dairy products, milk, cheese, yogurt, non-dairy coffee whiteners, beverages, confections and ice cream and having an aqueous dispersion or suspension of high density lipid comprising mixing together a molten high melting lipid, molten surfactant, and water under shear wherein the high density lipid structures the food.

34. The method according to claim 33 wherein said shear is provided by a turbo mixer, a colloid mill, a ball mill or a homogenizer.

35. The method according to claim 33 further comprising concentrating the suspension or dispersion.

36. A process for making a spread comprising dispersing a liquid oil into an aqueous dispersion of high melting lipid to form a first dispersion and then dispersing said first dispersion into a high melting lipid-containing oil phase wherein said high melting lipids structure the spread.

37. The process according to claim 36 wherein said continuous oil phase comprises 1–25 wt. % high melting lipids, said aqueous phase comprises 1–25 wt. % of one or more high melting lipid and said continuous oil phase comprises 25–95 wt. % of said spread and said internal oil phase comprises from 0 to 70 wt. % of said spread, said aqueous phase comprising 0 to 75 wt. % of said spread.

38. A fat based food product selected from the group consisting of water-continuous spreads, fat continuous spreads, bicontinuous spreads, dressings, beverages, dairy products, milk, cheese, yogurt, non-dairy coffee whiteners, beverages, confections and ice cream comprising an aqueous dispersion or suspension including:

a) one or more high melting lipids having a mean size of 15 microns or lower and b) a non-sterol emulsifier, the w/w ratio of emulsifier to high melting lipid in said aqueous phase being less than 1:2, the high melting lipids structuring the food product, wherein the fat used in the product is a fat comprising at least 30 wt. % of PUFA rich triglycerides, calculated on the total weight of the fat present in the product.

39. The dispersion according to claim 38 wherein said fat comprises at least 45 wt % PUFA rich triglycerides.

40. A fat based food product selected form the group consisting of water-continuous spreads, fat continuous spreads, bicontinuous spreads, dressings, beverages, dairy products, milk, cheese, yogurt, non-dairy coffee whiteners, beverages, confections and ice cream comprising an aqueous dispersion or suspension including:

a) one or more high melting lipids having a mean size of 15 microns or lower and b) a non-sterol emulsifier, the w/w ratio of emulsifier to high melting lipid in said aqueous phase being less than 1:2, wherein the fat used in the product comprises butterfat, and the total amount of phytosterol is in the range of 5–15 wt. %, the high melting lipids structuring the food product.

41. An aqueous phase dispersion or suspension comprising:

a) sterols esterified to hydrophilic groups and having a mean size of 15 microns or lower said sterols structuring the dispersion.

42. An edible, fat continuous spread comprising a continuous fat phase constituting from 15 to 80 wt. % of said spread and a discontinuous aqueous phase constituting from 20 to 85 wt.% of said spread, said aqueous phase comprising one or more high melting lipids selected from the group consisting of phytosterols, other sterols, hydrogenated and/or esterified phytosterols, and non-phytosterol surfactant wherein said high melting lipid structures the spread.

* * * * *